Jan. 5, 1965
W. STELZER
3,164,415
VEHICLE BRAKE MECHANISM
Filed Jan. 17, 1962
2 Sheets-Sheet 1
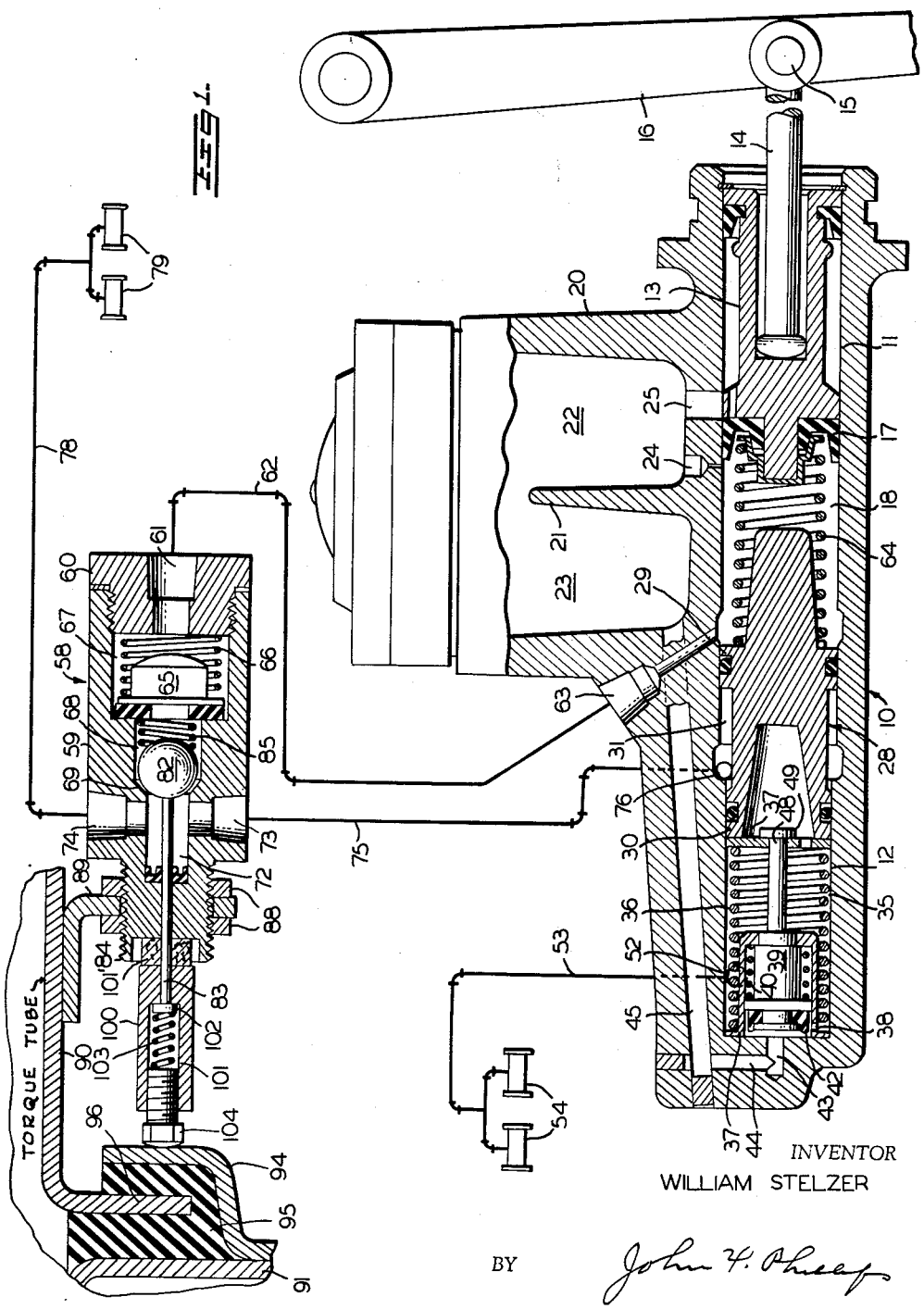
INVENTOR
WILLIAM STELZER
BY John F. Phelps
ATTORNEY Jan. 5, 1965 W. STELZER 3,164,415
VEHICLE BRAKE MECHANISM
Filed Jan. 17, 1962 2 Sheets-Sheet 2
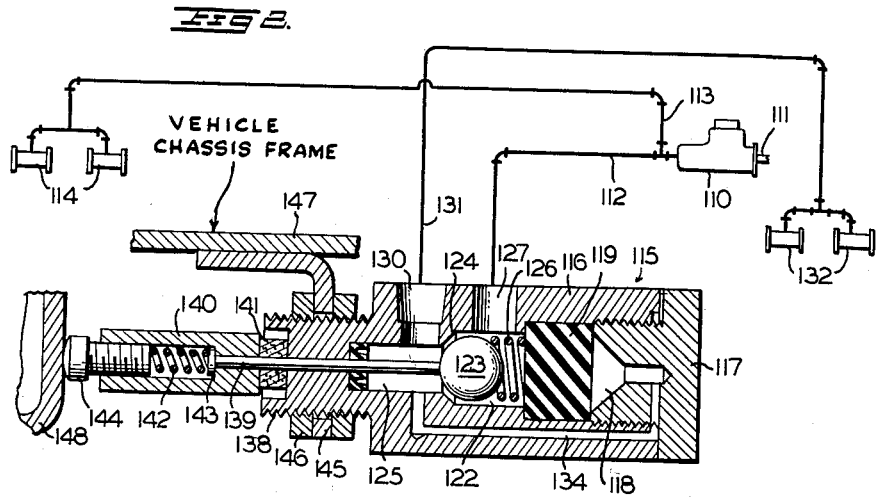
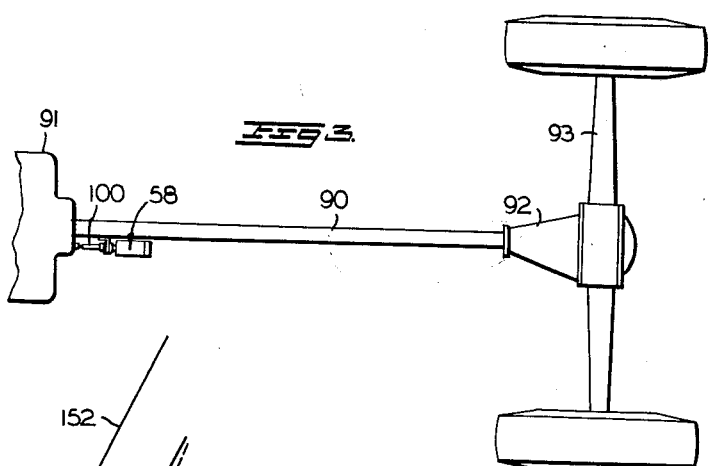
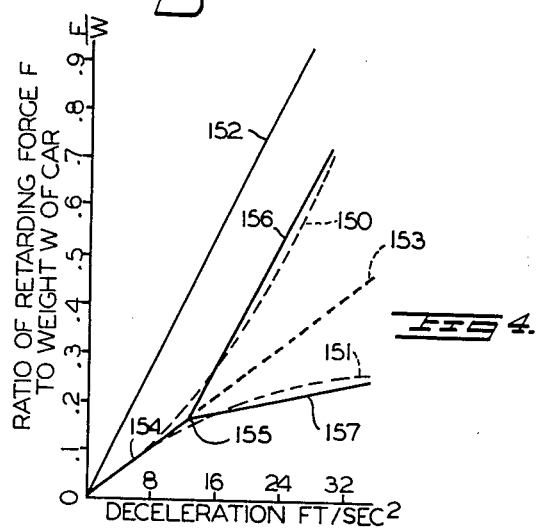
INVENTOR
WILLIAM STELZER
BY John F. Phillips
ATTORNEY United States Patent Office 3,164,415
Patented Jan. 5, 1965

3,164,415
VEHICLE BRAKE MECHANISM
William Stelzer, Bloomfield Hills, Mich., assignor to Kelsey-Hayes Company, Romulus, Mich., a corporation of Michigan
Filed Jan. 17, 1962, Ser. No. 166,815
14 Claims. (Cl. 303—6)

This invention relates to a vehicle brake mechanism, and more particularly to a mechanism for proportioning the fluid to the wheel cylinders of the vehicle to control the hydraulic pressure supplied to the wheel cylinders according to the weight transfer caused by vehicle deceleration when the brakes are applied.

The mechanism is related generally to the devices shown in my co-pending applications Serial Nos. 93,101, filed March 3, 1961, now Patent No. 3,087,761 and 116,394, filed June 12, 1961 now Patent No. 3,097,018. In such co-pending applications I have shown mechanisms adapted, when a given rate of vehicle deceleration is reached, to reduce the fluid supplied to certain wheel cylinders, more specifically the wheel cylinders at the rear of a passenger vehicle, thus minimizing the chance that the rear wheels will lock and slide, and providing for the substantially increased application of braking pressures to the front wheel cylinders. In such mechanisms, an inertia device comes into operation at a given rate of vehicle decleration to accomplish the desired results.

An important object of the present invention is to provide a deceleration responsive device which is an improvement over the prior structures referred to and provides for the displacement of brake fluid at substantially the same pressure to all of the wheel cylinders until a predetermined deceleration is reached, and to then limit the volume of fluid to certain wheel cylinders to compensate for the vehicle weight transfer occurring through such deceleration.

A further object is to provide in a mechanism of this character a novel by-pass or shut off valve responsive to vehicle deceleration as represented by brake torque or the retarding force of one axle of the vehicle, as distinguished from the deceleration devices shown in my prior constructions, to close a circuit of the braking system to limit the transmission of fluid to the rear wheel cylinders when a predetermined retarding force is reached.

A further object is to provide a mechanism of this character which utilizes relative longitudinal movement between certain vehicle parts, occurring upon a pre-determined rate of vehicle decleration, for closing or retarding the fluid circuit to the rear wheel cylinders of the vehicle.

Other objects and advantages of the invention will become apparent during the course of the following description.

In the drawings I have shown two embodiments of the invention. In this showing

FIGURE 1 is a sectional view, parts being shown in elevation, of a divided vechicle master cylinder and by-pass valve, the brake fluid lines and wheel cylinders being diagrammatically illustrated;

FIGURE 2 is a sectional view of a modified type of bypass valve shown in a diagrammatically illustrated modified form of a brake system;

FIGURE 3 is a plan view of a portion of a motor vehicle showing the mode of application of the by-pass valve, and FIGURE 4 is a graph illustrating the distribution of braking pressures under different conditions.

Referring to FIGURE 1, the numeral 10 designates a master cylinder as a whole having therein two bores 11 and 12 in the former of which is mounted a plunger 13 of conventional form operable by a push rod 14 connected as at 15 to a brake treadle 16. The plunger 13 is sealed in the bore 11 as at 17. Ahead of the plunger 13, that is to the left thereof in FIGURE 1, is formed a pressure chamber 18. The master cylinder 10 carries a conventional reservoir 20 divided by a partition 21 therein to form chambers 22 and 23, and the chamber 22 communicates with the bore 11 conventionally through ports 24 and 25. The purpose of the chamber 23 will be described below.

A second plunger indicated as a whole by the numeral 28 is provided with heads 29 and 30 respectively slidable in the bores 11 and 12 and to the left of the head 29 is formed a relatively small chamber 31 for a purpose to be described.

To the left of the head 30 is formed a chamber 35 in which is arranged a spring 36 engaging an apertured plate 37 seated against the adjacent end of the head 30. The opposite end of the spring 36 seats against a cage 37 which, in turn, seats against the adjacent end of the bore 12 and is provided with a port 38. Within the cage 37 is slidable a plunger 39 urged to the left by a small spring 40 to tend to seat a normally open resilient valve 42 to close a port 43. This port communicates through passages 44 and 45 with the chamber 23 to supply replenishing fluid to the chamber 35. The plunger 39 carries a stem 48, headed as at 49 behind the plate 37. With the parts in their normal positions as shown, the head 49, connected to the plunger 39, retains the valve 42 open.

The chamber 35 communicates through a port 52 with a line 53 leading to the front wheel brake cylinders 54 of the vehicle, and the port 52 is preferably provided with a conventional residual pressure valve (not shown). Again referring to FIGURE 1, the numeral 58 designates a by-pass valve as a whole comprising a body 59 having threaded in one end thereof a plug 60 ported as at 61 for communication with one end of a fluid line 62, and the other end of this line is connected to a port 63 communicating with the chamber 18 to receive fluid therefrom when the plunger 13 is operated. This plunger is biased to its normal position by a spring 64 engaging both plungers 13 and 28 and biases the plunger 13 to its normal off position. Fluid in the chamber 18 acts as a mechanical link to effect movement of the plunger 28 upon operation of the brake treadle 16.

The port 61 communicates with a chamber 67 formed in the valve body 59 and a conventional residual pressure valve 65, provided with the usual spring 66, controls communication between the chamber 67 and a chamber 68 normally communicating through a valve seat 69 with a smaller axial chamber 72. The latter chamber communicates with two ports 73 and 74 the former of which communicates with one end of a fluid line 75 leading to a port 76 communicating with the chamber 31. The port 76 need not be provided with a residual pressure valve as will be understood. The port 74 communicates with one end of a fluid line 78 leading to the rear wheel brake cylinders 79.

Within the chamber 68 is arranged a ball valve 82 normally maintained off the seat 69 by a stem 83 slidable through a threaded axial extension 84 carried by the valve body 59. The ball 82 is urged toward its seat by a spring 85 weaker than the spring 66 and adapted to overcome frictional resistance to sliding movement of the stem 83.

Nuts 88 are threaded on the axial extension 84 to fix in position relative to the valve body 59 an attaching bracket 89. This bracket is welded or otherwise secured to a part of the vehicle which moves longitudinally relative to other parts of the vehicle during vehicle deceleration. In the present instance, the bracket is shown as being attached to the forward end of the torque tube 90 of the vehicle. It will be understood that only a portion of such tube is shown and this is the tube in common use on a number of motor vehicles and through which the drive shaft extends from the vehicle transmission 91 (FIGURES 1 and 3) to the differential 92 of the rear axle assembly 93. In such case, a casing 94 (FIGURE 1) is fixed to the transmission casing 91 and contains a resilient body 95 into which projects a flange 96 carried by the torque tube 90.

A head 100 (FIGURE 1) slidably receives the adjacent end of the stem 83 and is maintained in axial spaced relation to the axial extension 84 by a spring 103. A bore 101 within the head 100 receives a head 102 formed on the end of the stem 83. The head 102 is biased to its normal position by spring 103, and this spring engages a headed screw 104 having its outer end maintained in contact with the adjacent surface of the casing 94. A seal 101' protects stem 83.

In FIGURE 2 of the drawings a modified form of the system is shown. This form of the invention has been shown in conjunction with a conventional master cylinder and with a vehicle which does not employ a torque tube drive. Referring to FIGURE 2, the numeral 110 designates a conventional master cylinder operable by a push rod 111 connected to the usual brake pedal or treadle (not shown). This master cylinder is provided with the usual residual pressure valve through which fluid flows to one end of a fluid line 112. One end of a fluid line 113 is tapped to this line and leads to the front wheel brake cylinder 114.

In this case the by-pass valve, indicated as a whole by the numeral 115, comprises a body 116 having a plug 117 threaded into one end thereof and provided in its inner face with a preferably conical recess 118. Within the body 116 is arranged a resilient block 119 deformable, as described below, to enter the recess 118 to displace fluid therefrom.

The body 116 to the left of the block 119 is provided with a chamber 122 in which is arranged a ball 123 normally disengaged from a seat 124 communicating with an axial chamber 125. The ball 123 is biased toward its seat by a spring 126. The chamber 122 is ported as at 127 for communication with the other end of the fluid line 112. The chamber 125 communicates through a port 130 with one end of a fluid line 131 leading to the rear wheel brake cylinders 132.

The valve body 116 and plug 117 are provided with passage means 134 communicating at one end with the chamber 125 and at the other end with the cavity 118. Under conditions to be described, with the valve 123 closed, pressure in the chamber 122 will deform the block 119 into the cavity 118 to displace a small amount of fluid therefrom through the passage means 134 into the chamber 125 and thence through line 131 into the rear wheel cylinders 132.

A threaded axial extension 138 on the valve body 116 slidably supports a stem 139, corresponding to the stem 83 previously described, engaging at one end against the ball 123 to normally maintain such ball unseated. The stem 139 is slidable in a bored head 140 and a seal 141 is arranged between the valve body 116 and head 140. Such head is spaced from the extension 138 by a spring 142. Spring 142 engages a head 143 on the stem 139 and has its other end engaging a headed screw 144. A bracket 145 is attached to the extension 138 by nuts 146.

The form of the invention in FIGURE 2, as stated, is illustrated in conjunction with a vehicle which does not employ a torque tube. In such case, the bracket 145 is attached to some portion of the vehicle frame 147 to fix the by-pass valve relative thereto. In this case, the head of the screw 144 directly engages a portion of the transmission casing 148. It will be understood that in accordance with common practice, the vehicle engine and the transmission connected thereto are supported relative to the vehicle chassis by rubber mountings and accordingly the portion of the vehicle frame 147 and transmission casing 148 are capable of and do in fact partake of relative movement longitudinally of the vehicle during vehicle deceleration when the brakes are applied.

It will be noted that in each form of the invention, as distinguished from my earlier applications referred to and from certain patents in the prior art, there is no valve which is responsive to its own inertia to secure the desired results. It also will be noted that advantage is taken of linear relative movement between vehicle parts which are sprung. Accordingly, there is a direct line movement between the two vehicle parts which reflects very accurately the brake torque. For example, in FIGURE 1, there is direct linear fore and aft movement between the transmission housing 91 and the forward end of the torque tube 90. Incidentally, it is pointed out that while the rear end of the torque tube is unsprung, the forward end thereof is sprung through its connection with the transmission housing, and accordingly does not partake of appreciable vertical movement. In FIGURE 2 there is similar linear movement fore and aft between the transmission housing 148 and the vehicle chassis frame 147. As explained below, this fore and aft movement in FIGURE 1 is the result of brake torque produced by the rear wheels only, while in FIGURE 2, the relative movement is due to brake torque developed in all four wheels of the vehicle. Moreover, in each case there is a resilient body tending to hold the relative movable parts in normal positions, this being the elastomeric body 95 in FIGURE 1 and the conventional rubber mountings for the motor and transmission in FIGURE 2. When these bodies are deformed by longitudinal movement between the parts 90 and 91 in FIGURE 1 and 147 and 148 in FIGURE 2, the relative movement reflects accurately the brake torque, thus causing the valve 82 or 123 to close accurately under predetermined conditions.

FIGURE 4 shows a graphic representation of brake pressures occurring under different conditions. In this graph the ratio of the retarding force to the weight of the vehicle is plotted against the rate of deceleration of the vehicle. In the interest of simplicity the static weight of distribution of the vehicle is assumed to be equal for the front and rear wheels, so that the hydraulic pressure is also representative of the retarding force when the coefficient of friction is assumed to be constant. The dotted curve 150 represents the ideal retarding force or hydraulic pressure at the front wheels while the dotted curve 151 represents the ideal retarding force or hydraulic pressure at the rear wheels in relation to deceleration and vehicle weight transfer resulting from such deceleration. As is well known, the inertia affecting the body of the vehicle tends to shift the weight forwardly when the vehicle is decelerated thus making it desirable ideally to increase the braking action at the front wheels and to decrease the braking force at the rear wheels, thus minimizing the chance of locking and sliding the rear wheels.

In FIGURE 4 the solid line 152 represents the total retarding force of the vehicle, while the dotted line 153 represents the retarding force or hydraulic pressure at each of the front and rear wheel cylinders when no vehicle weight transfer compensating means are used. The solid line 154 represents the increase in the front and rear wheel cylinder hydraulic pressures up to the point 155 where the ball valve 82 (or 123) closes as described below. From such point on, front wheel hydraulic pressures are represented by the solid line 156 while rear wheel pressures are represented by the solid line 157. It will be noted that the lines 156 and 157 closely approximate the ideal distribution of pressures as represented by the dotted lines 150 and 151.

Operation

Referring to FIGURE 1, it will be noted that the parts are shown in their normal positions, the valve 82 being held away from its seat by the spring 103. When the brakes are to be operated, the pedal 16 will be depressed to directly actuate the plunger 13 to move it to the left to build up pressure in the chamber 18. Fluid will flow from this chamber through port 63, line 62, chamber 67, past the residual pressure valve 65 into the chamber 72 and then through line 78 to the rear wheel cylinders 79. Pressure built up in the chamber 18 will effect movement of the plunger 28 to the right, thus reducing the capacity of the chamber 31 and displacing therefrom a small amount of fluid which flows through pipe 75 into the chamber 72 and thence to the rear wheel cylinders. Movement of the plunger 28 to the left displaces fluid from the chamber 35 through port 52, through the residual pressure valve (not shown) associated therewith and through line 53 to the front wheel cylinders 54.

Thus pressure will be built up in both sets of wheel cylinders to apply the front and rear brakes. As braking pressures are built up, brake torque, affecting the rear wheels, will be transmitted through the torque tube 90 to the resilient body 95, thus effecting relative longitudinal movement of the torque tube 90 and transmission 91, to which rear wheel brake torque is not directly transmitted. Accordingly the resilient body 95 will be deformed to an appreciable extent and the torque tube 90, bracket 89 and valve housing 59 will move rearwardly relative to the transmission 91. The spring 85 and pressure acting on the rear end of the stem 83 will hold the screw 104 in engagement with the transmisison 94. Thus the valve housing 59 will move the valve seat 69 into engagement with the ball 82, and prevent any further flow of brake fluid past the residual pressure valve 65. Pressure in the chamber 18 will continue to move the plunger 28 forwardly or to the left, and this plunger will continue to displace fluid from the chambers 31 and 35. Accordingly only a small additional amount of fluid will be supplied to the rear wheel cylinders from the chamber 31 through lines 75 and 78. Since only a small area of the plunger 28, namely the forward face of the head 29, will be called on to build up pressure in the chamber 31, the left-hand end of the head 30 will become more effective than in earlier stages of brake operation for building up pressure in the chamber 35. Thus higher pressures will be generated in the wheel cylinders 54 and such pressure can be tolerated at the front of the vehicle because of the weight of the engine.

Accordingly the mechanism provides an ideal system for generating maximum effective brake pressures in both the front and rear wheel cylinders. When the brake torque affecting the rear wheels reaches a pre-determined point, there can be very little additional pressure generated in the rear wheel cylinders by fluid from the chamber 31. Accordingly locking and sliding of the rear wheels are minimized or eliminated. At the same time, for a given pedal pressure, higher pressures will be built up in the front wheel cylinders 54 after the valve 82 closes under the conditions referred to. Thus very substantial and wholly tolerable front wheel braking can be effected.

It will be apparent that immediately upon initial movement of the plunger 28 to apply the brakes, movement of the plate 37 to the left allows the spring 40 to seat the valve 42. When the pedal is released, pressure drops in the chamber 18 whereupon the spring 36 moves the plunger 28 back to its normal position, which position is reached when the spring 36 expands to its limit, namely at the point where the head 49 engages the plate 37, followed by the limited movement of the plunger 39 which takes place to open the valve 42. When this valve is open, replenishing fluid flows from the chamber 23 through passages 45, 44, and 43 into the chamber 35. Movement of the plunger 28 back to normal position transmits force through the spring 64 to the plunger 13 to return it to its normal position.

It will be apparent that upon the releasing from the torque tube 90 of forces delivered thereto by brake torque, the resilient body 95 will return to its normal shape and the torque tube 90 will be moved slightly forward to transmit movement to the valve body 59 whereupon the stem 83 will open the valve 82. Thus the by-pass valve 58 is restored to normal condition ready for the next brake operation.

In connection with the opening of the valve 82, it will be noted that the degree of opening of valve 82 is adjusted by turning the screw 104, thus adjusting the device so that the ball 82 opens at a predetermined retarding force of the rear axle. This adjustment may be chosen to occur when the deceleration is approximately 10 feet per second per second. Seating of the ball 82 is effected by the spring 85 which, as stated, is lighter than the spring 66 so as not to open the residual pressure valve 65. In addition to the force of the spring 85 acting to the left, pressure in the chamber 72 also acts on the cross sectional area of the inner end of the stem 83. These forces are never sufficient to compress the spring 103 and the latter yields only in case of an accidental fore and aft shock on the torque tube 90 after the ball 82 is closed and there is a substantial pressure difference between the chambers 68 and 72.

Actually in operation, as brake pressure is gradually increased, the opening through the valve seat 69 becomes progressively smaller until it is completely closed when a predetermined retarding force on the torque tube 90 is reached. After this the output in volume to the front and rear cylinders is fixed by the ratio of the areas of the chambers 31 and 35 and the cross sectional area of the chamber 31 is considerably smaller than that of the chamber 35 hence the latter produces a higher pressure and the chamber 31 a lower pressure as the hydraulic pressure in the chamber 18 increases. The relation between these pressures and their adherence to the ideal pressures give the best brake effectiveness and distribution.

In the form of the invention shown in FIGURE 2, a conventional master cylinder 110 is employed from the single pressure chamber of which fluid flows through divided lines to the front and rear wheel cylinders, the flow to the front cylinders being directly through the line 113. From the line 112, fluid flows to the chamber 122, through seat 124 into chamber 125, and thence through line 131 to the rear wheel cylinders 132. Thus pressures in the front and rear wheel cylinders will be the same during earlier stages of brake operation.

In vehicles that do not have a torque tube, the valve device 115 is secured to a portion 147 of the vehicle body, while the head of the nut 144 directly engages the transmission housing 148 or any part of the engine. In such case the object is to use the inertia of the engine and transmission, supported by rubber mountings to operate the valve 115 during deceleration. Instead of just the rear brakes retarding the rear axle as in the system shown in FIGURE 1, the front and rear brakes act to retard the body of the vehicle. The inertia of the engine and transmission cause it to move relatively forwardly, and the valve 123 will engage the seat 124 as in the previous case to cut off communication between the lines 112 and 131. Thus the principle of operation is the same in either form of the invention. When this occurs, pressure will build up in the line 113 and in the wheel cylinders 114 since fluid displacement in the master cylinder 110 is not now being substantially equally divided. With the ball 123 closed, pressure in the chamber 122 deforms the soft resilient body 119 into the cavity 118, which has been filled with brake fluid. Small quantities of such fluid will be displaced as in the case of the chamber 31 in FIGURE 1, thus supplying a small additional quantity of fluid through the passage 134 into the line 131. The quantity of fluid thus displaced will depend upon the pressure in the chamber 122 and the extent to which the block 119 is deformed into the cavity 118.

Certain advantages are obtained by the use of this system with a vehicle employing a torque tube which cannot be obtained in any other way. The closing of the ball 82 (FIGURE 1) does not depend on the deceleration of the vehicle as a whole but on the deceleration specifically produced by the brake torque at the rear wheels. Thus if the rear brakes, due to a change in coefficient of friction, do not do their share of braking, the ball valve will close slightly later. This produces a very desirable compensating feature in that it gives more effective braking and a shorter stopping distance.

Since in either form of the invention, fluid transmitted to the rear wheel cylinders is only a small fraction in volume of that transmitted to the front wheel cylinders upon the closing of the ball valve, the pressure in the front wheel cylinders increases at a higher rate than pressure in the rear wheel cylinders. In other words, the pressure increase from the start of the braking operation occurs as graphically represented by the line 154 in FIGURE 4, the ball valve in either case closing at the point 155. From this point on the braking action at the front wheels increases quite rapidly as indicated by the line 156, while the pressure increase in the rear wheel cylinders is at a much lower rate as indicated by the line 157.

In this connection it will be noted that up to the point 155 (FIGURE 4) where the ball valve in either case closes, pedal or booster motor forces are divided in the generation of pressures to the front and rear wheel cylinders. This division of pressure generating forces changes beyond the point 155, smaller pedal forces being required to generate pressure in the chamber 31 (or cavity 118). Thus greater pedal forces will be utilized for generating pressures for applying the front wheel brakes. The result therefore is to utilize simple means operable in accordance with vehicle deceleration for reducing the rate of pressure increases at the rear wheels while increasing the rate of pressures at the front wheels. This provides for conditions closely approaching the ideal, as stated above, and greatly minimizes any chance that the rear wheels will lock and slide. Thus highly efficient brake distribution is attained without sacrificing the total braking forces to which the vehicle is subjected.

It will be noted that whereas a cut-off ball valve in my earlier constructions depends on inertia of the ball in each case, such inertia does not affect the ball valve 82 or 123 in the present mechanism, the inertia of the ball being opposed by the spring 103 in FIGURE 1 and 142 in FIGURE 2. The inertia employed in the present system to close the ball valve is that which effects relative movement between two parts of the vehicle which are of such nature that they move relative to each other longitudinally of the vehicle to effect movement of the ball valve to closed position. As previously stated, the relative movement between the two parts of the vehicle is linear, fore and aft of the vehicle and the positioning of the valve 82 or 123 is directly dependent upon the degree of the relative movement referred to and such movement, in turn, accurately reflects the brake torque being produced. The inertia of the ball valves 82 and 123 does not affect the position thereof, and as distinguished from constructions which use the inertia of valves, weight arms, etc., the valves are not subject to undesirable variations in movement due to the vertical movement of the sprung parts of the vehicle. Moreover, there is no fore and aft movement of the ball valve referred to, except as determined by the fore and aft relative movement of the two body parts referred to.

It is to be understood that the forms of the invention shown and described are to be taken as preferred examples of the same and that various changes in the shape, size, and arrangement of the parts may be made as do not depart from the spirit of the invention or the scope of the appended claims.

I claim:

1. In a brake system for use on a vehicle having two sprung parts inertia-responsive to move linearly relatively oppositely longitudinally of the vehicle and arranged so that said relative movement accurately represents the retarding force of the brakes of the vehicle, a fluid pressure generating device, separate fluid pressure lines connected to said device and extending respectively to different sets of wheel cylinders of the vehicle, and a valve device having a housing fixed to the one of said parts of the vehicle which is movable relatively rearwardly under vehicle decelerating conditions, a passage through said valve housing connected in one of said fluid lines and including a valve seat, a normally open valve engageable with said seat and biased toward engagement therewith, and means controlled by the other of said parts of the vehicle for normally maintaining said valve off its seat whereby, when said one part of the vehicle moves relatively rearwardly under vehicle decelerating conditions, said seat will move relatively rearwardly into engagement with said valve to close it and thus close communication through said one line to limit the supply of pressure fluid to the associated set of wheel cylinders.

2. In a brake system for use on a vehicle having two sprung parts inertia-responsive to move linearly relatively oppositely longitudinally of the vehicle and arranged so that said relative movement accurately represents the retarding force of the brakes of the vehicle, a fluid pressure generating device, separate fluid pressure lines connected to said device and extending respectively to different sets of wheel cylinders of the vehicle, and a valve device having a housing fixed to the one of said parts of the vehicle which is movable relatively rearwardly under vehicle decelerating conditions, a passage through said valve housing connected in one of said fluid lines and including a valve seat, a normally open valve engageable with said seat and biased toward engagement therewith, means controlled by the other of said parts of the vehicle for normally maintaining said valve off its seat whereby, when said one part of the vehicle moves relatively rearwardly under vehicle decelerating conditions, said seat will move relatively rearwardly into engagement with said valve to close it and thus close communication through said one line to limit the supply of pressure fluid to the associated set of wheel cylinders, and means responsive to pressure generated by said pressure generating device for supplying a relatively small quantity of brake fluid under pressure to said one line between said valve and said associated set of wheel cylinders.

3. In a brake system for use on a vehicle having two sprung parts inertia-responsive to move linearly relatively oppositely longitudinally of the vehicle and arranged so that said relative movement accurately represents the retarding force of the brakes of the vehicle, a fluid pressure generating device, separate fluid pressure lines connected to said device and extending respectively to different sets of wheel cylinders of the vehicle, and a valve device having a housing fixed to the one of said parts of the vehicle which is movable relatively rearwardly under vehicle decelerating conditions, a passage through said valve housing connected in one of said fluid lines and including a valve seat, a normally open valve associated with said seat and biased toward engagement therewith, a stem slidable in said valve housing, and having a rear end extending into said housing and into engagement with said valve and having a normal position in which it maintains said valve unseated whereby, when said housing moves relatively rearwardly under vehicle decelerating conditions incident to similar movement of said one vehicle part, said seat will engage said valve to close it and thus close communication through said one line to limit the supply of pressure fluid to the associated set of wheel cylinders.

4. A system according to claim 3 wherein said one line has one end connected to said pressure generating device and its other end connected to said associated set of wheel cylinders, and means responsive to pressure generated by said pressure generating device for supplying a relatively small quantity of brake fluid under pressure to said other end of said one line.

5. In a brake system for use on a vehicle having two sprung parts inertia-responsive to move linearly relatively oppositely longitudinally of the vehicle and arranged so that said relative movement accurately represents the retarding force of the brakes of the vehicle, a fluid pressure generating device, separate fluid pressure lines connected to said device and extending respectively to different sets of wheel cylinders of the vehicle, and a valve device having a housing arranged with its axis longitudinally of the vehicle and fixed to the one of said parts of the vehicle which is movable relatively rearwardly under vehicle decelerating conditions, said valve housing having a passage therethrough connected in one of said fluid lines and including a valve seat coaxial with said housing, a normally open valve rearwardly of said seat and biased toward engagement therewith, a stem slidable coaxially in the forward end of said body, the rear end of said stem having a normal position unseating said valve, said stem having mechanical engagement with the other of said parts of the vehicle whereby, when said one part of the vehicle moves relatively rearwardly incident to vehicle decelerating conditions, said housing and said valve seat will also move relatively rearwardly to engage said seat with said valve to close communication through said one line.

6. A system according to claim 5 wherein said valve housing has a pair of chambers respectively forwardly and rearwardly of said valve, said one line having one end connecting the rear chamber to said pressure generating device, said one line having its other end communicating between the forward chamber and the associated set of wheel cylinders, and means responsive to pressure in said pressure generating device for displacing a relatively small quantity of brake fluid to said forward chamber and thus to said other end of said one line, said relatively small quantity of fluid being the only fluid supplied to said associated set of wheel cylinders when said valve is closed.

7. In a brake system for use on a vehicle having two sprung parts inertia-responsive to move linearly relatively oppositely longitudinally of the vehicle and arranged so that said relative movement accurately represents the retarding force of the brakes of the vehicle, a master cylinder having a rear bore and a coaxial forward bore of slightly smaller diameter, a first plunger slidable in said rear bore, a second plunger having a forward head slidable in said forward bore and a rear head slidable in said rear bore, said rear head forming with said first plunger a first pressure chamber, said forward head forming with the adjacent end of said forward bore a second chamber, a fluid line connecting said second chamber to one set of wheel cylinders, a fluid line connected at one end to said first chamber and at its other end to the other set of wheel cylinders, a valve device comprising a housing fixed to the one of said vehicle parts which moves relatively rearwardly under vehicle decelerating conditions and provided with a passage therethrough connected in said second fluid line, a normally open valve in said passage biased to closed position, and means connected between said valve and said other vehicle part for releasing said valve for seating movement when said one vehicle part moves relatively rearwardly under vehicle decelerating conditions.

8. A system according to claim 7 wherein said rear head forms with said rear bore a relatively small chamber, a third fluid line connecting said relatively small chamber to said other end of said second fluid line whereby, when said valve is closed, the only fluid which will be supplied to said other set of wheel cylinders will be the relatively small quantity of fluid displaced from said relatively small chamber.

9. In a brake system for use on a vehicle having two sprung parts inertia-responsive to move linearly relatively oppositely longitudinally of the vehicle and arranged so that said relative movement accurately represents the retarding force of the brakes of the vehicle, a master cylinder having one fluid line connected to one set of wheel cylinders and a second fluid line communicating at one end with said master cylinder and at its other end with the other wheel cylinders, and a valve device comprising a housing fixed to the one of said vehicle parts which moves relatively rearwardly under vehicle decelerating conditions, said housing having a passage therethrough connected in said second fluid line between said ends thereof and provided with a valve seat, a normally open valve arranged rearwardly of said seat, a stem arranged longitudinally of the vehicle and slidable in the forward end of said valve body and having its forward end mechanically engaging said other vehicle part, and a spring biasing said valve forwardly into engagement with the rear end of said stem when said valve is in said normal open position, relative rearward movement of said valve housing with said one vehicle part releasing said stem from said valve whereby said spring will seat said valve and close communication through said passage.

10. A system according to claim 9 wherein said passage through said valve housing includes chambers forwardly and rearwardly of said valve seat communicating respectively with said other end and said one end of said second fluid line, and a resilient block forming the rear wall of said rear chamber, said valve housing having a recess rearwardly of said resilient block filled with brake fluid, said valve body having a passage connecting said recess to said forward chamber whereby, when said valve is closed, pressure in said rear chamber will deform said resilient block into said recess to displace a small quantity of fluid therefrom into said forward chamber and thence into said other end of said second fluid line.

11. In combination with a motor vehicle having two sprung parts resiliently movable linearly relative to each other longitudinally of the vehicle under vehicle decelerating conditions; a fluid pressure generating device, separate fluid pressure lines connected to said device and extending respectively to different sets of wheel cylinders of the vehicle, and a valve device having portions relatively movable longitudinally of the vehicle and connected respectively to said two parts of the vehicle, said valve device being connected in one of said fluid lines, said relatively movable portions of said valve device comprising a normally open valve normally held unseated by the one part of the vehicle which moves relatively forwardly under vehicle decelerating conditions, and a valve seat fixed to the one of said vehicle parts which moves relatively rearwardly under vehicle decelerating conditions, said valve seat being arranged forwardly of said valve whereby, when said last named vehicle part moves relatively rearwardly, said seat will engage said valve and close communication through said one fluid line.

12. The combination set forth in claim 11 provided with means responsive to pressure in said pressure generating device for supplying a relatively small quantity of brake fluid to the wheel cylinders associated with said one fluid line.

13. In combination with a motor vehicle having a transmission unit and a torque tube resiliently connected at its forward end to said transmission unit whereby, under vehicle decelerating conditions, said torque tube moves rearwardly relative to said transmission unit; a fluid pressure generating device, separate fluid lines connected to said device, one of said fluid lines being connected to the front wheel brake cylinders and the other being connected to the rear wheel brake cylinders, and a valve device having portions connected to said end of said torque tube and provided with a passage therethrough including a valve seat, and other portions having connection with said transmission unit and including a valve rearwardly of said seat and normally held open by said transmission unit, and a spring biasing said valve toward said seat whereby, when said first named portions of said valve device move relatively rearwardly with said torque tube under vehicle decelerating conditions, said valve seat will engage said valve and close communication through said other fluid line.

14. The combination set forth in claim 13 provided with means responsive to pressure in said pressure generating device for displacing a relatively small quantity of brake fluid to said rear wheel cylinders independently of said valve.

References Cited in the file of this patent
UNITED STATES PATENTS

| | | |
|---|---|---|
| 1,645,400 | Porsche | Oct. 11, 1927 |
| 2,098,653 | Carroll | Nov. 9, 1937 |
| 2,225,315 | McCollum | Dec. 17, 1940 |
| 2,903,100 | Freeman | Sept. 8, 1959 |
| 2,924,306 | Martin | Feb. 9, 1960 |
| 3,035,870 | Beatty | May 22, 1962 |